(12) United States Patent
Chang et al.

(10) Patent No.: US 9,423,906 B2
(45) Date of Patent: Aug. 23, 2016

(54) DRIVE SYSTEM ADAPTABLE TO A MATRIX SCANNING DEVICE

(76) Inventors: Ching-Yang Chang, Jhudong Township (TW); Jui-Jung Chin, Zhudong Township (TW); Ta-Kang Chou, Yongkang (TW)

(*) Notice: Subject to any disclaimer, the term of this patent is extended or adjusted under 35 U.S.C. 154(b) by 284 days.

(21) Appl. No.: 13/299,360

(22) Filed: Nov. 18, 2011

(65) Prior Publication Data
US 2012/0293426 A1    Nov. 22, 2012

(30) Foreign Application Priority Data
May 17, 2011    (CN) .......................... 2011 1 0127993

(51) Int. Cl.
| | | |
|---|---|---|
| G09G 3/36 | (2006.01) | |
| G06K 9/60 | (2006.01) | |
| G06F 3/045 | (2006.01) | |
| G06F 3/041 | (2006.01) | |
| G06F 3/047 | (2006.01) | |
| G06F 3/044 | (2006.01) | |

(52) U.S. Cl.
CPC .............. *G06F 3/0416* (2013.01); *G06F 3/044* (2013.01); *G06F 3/047* (2013.01)

(58) Field of Classification Search
CPC ......... G06F 3/044; G06F 3/041; G06F 3/045; G06K 9/00
USPC ....................................................... 345/100, 98
See application file for complete search history.

(56) References Cited

U.S. PATENT DOCUMENTS

| | | | |
|---|---|---|---|
| 5,893,623 A | 4/1999 | Muramatsu | |
| 2005/0156862 A1* | 7/2005 | Hirayama ............ | G09G 3/3677 345/100 |
| 2008/0158177 A1 | 7/2008 | Wilson et al. | |
| 2010/0110040 A1* | 5/2010 | Kim et al. ...................... | 345/174 |
| 2010/0156885 A1* | 6/2010 | Cho et al. ...................... | 345/214 |
| 2010/0182278 A1* | 7/2010 | Li et al. ........................ | 345/174 |
| 2010/0225598 A1* | 9/2010 | Shen ............................. | 345/173 |

\* cited by examiner

*Primary Examiner* — Temesgh Ghebretinsae
*Assistant Examiner* — Paras D Karki

(57) ABSTRACT

The present invention is directed to a drive system adaptable to a matrix scanning device. A number of first drive circuits are disposed on a first periphery along a first direction of a substrate with each said first drive circuit being coupled to at least one column wire of the matrix scanning device. A number of second drive circuits are disposed on a second periphery along a second direction of the substrate with each said second drive circuit being coupled to at least one row wire of the matrix scanning device. A master controller controls the first drive circuits and the second drive circuits. A bus is electrically coupled to the master controller, the first drive circuits and the second drive circuits.

7 Claims, 5 Drawing Sheets

US 9,423,906 B2

DRIVE SYSTEM ADAPTABLE TO A MATRIX SCANNING DEVICE

BACKGROUND OF THE INVENTION

This application claims the benefit of People's Republic of China Application No. 201110127993.5, filed on May 17, 2011.

1. Field of the Invention

The present invention generally relates to a matrix scanning device, and more particularly to a drive system adaptable to a matrix scanning device.

2. Description of Related Art

Touch panel is a matrix scanning device that has column wires and row wires constructed in a matrix form. The detection of touch is commonly carried out by sequentially scanning the row wires and receiving response from the column wires. As resolution of the touch panel is increasing, more wires are required to accomplish the touch detection. However, more wires mean that more border space of the touch panel need be set aside to accommodate the increased wires fanning out of the touch panel, therefore making the touch panel more bulky or making it difficult for miniaturizing the touch panel.

Moreover, a controller operatively coupled to the row and column wires of the conventional touch panel can be designed, built and manufactured only for a corresponding touch panel. In other words, each kind of touch panel needs its dedicated controller, thereby making it difficult for standardizing the controller and wasting manpower and increasing time to market.

For the foregoing reasons, a need has arisen to propose a novel drive system that can overcome the growing boarder space problem and is capable of universally being adapted to a variety of touch panels.

SUMMARY OF THE INVENTION

In view of the foregoing, it is an object of the present invention to provide a drive system adaptable to a matrix scanning device that can substantially reduce the wiring amount on the border space of the matrix scanning device and is adjustably compatible with different size of the matrix scanning device.

According to one embodiment, a drive system adaptable to a matrix scanning device includes first drive circuits, second drive circuits, a master controller and an electrical bus. The first drive circuits are disposed on a first periphery along a first direction of a substrate with each said first drive circuit being coupled to at least one column wire of the matrix scanning device. The second drive circuits are disposed on a second periphery along a second direction of the substrate with each said second drive circuit being coupled to at least one row wire of the matrix scanning device. The master controller is configured to control the first drive circuits and the second drive circuits. The bus is electrically coupled to the master controller, the first drive circuits and the second drive circuits.

DETAILED DESCRIPTION OF THE INVENTION

Figure 1:
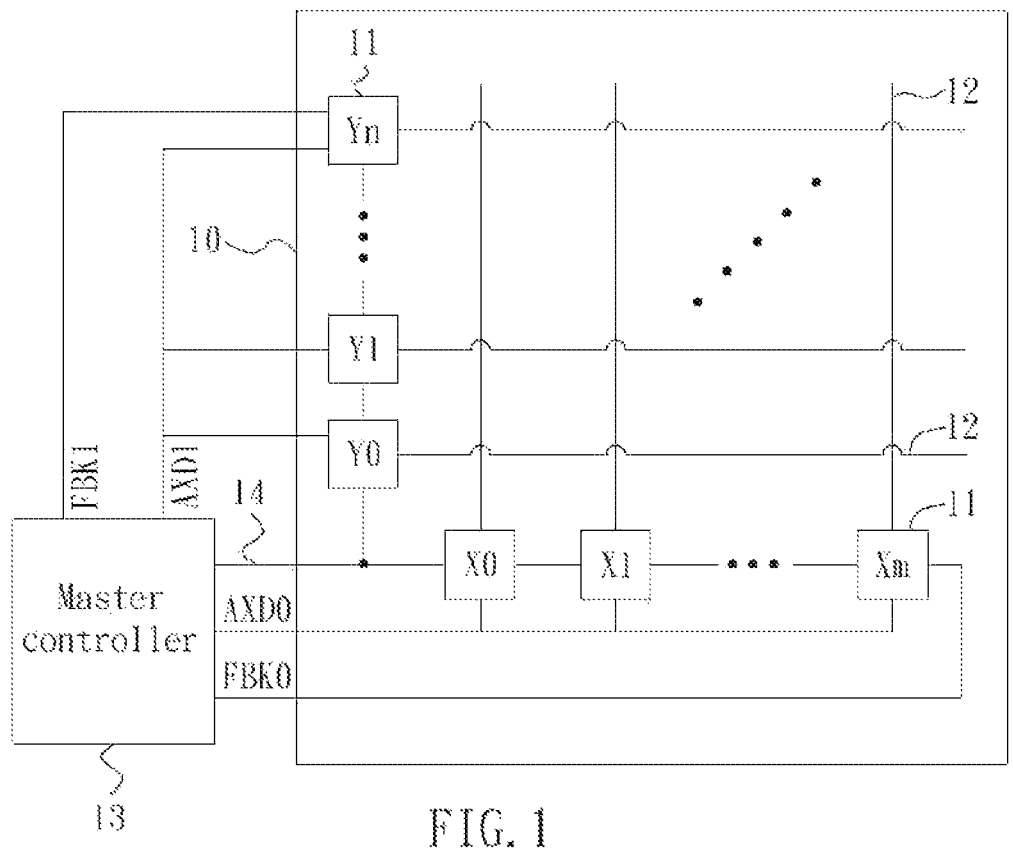
FIG. 1 shows a block diagram of a drive system adaptable to a matrix scanning device according to one embodiment of the present invention.

FIG. 1 shows a block diagram of a drive system adaptable to a matrix scanning device such as, but not limited to, a touch panel or a liquid crystal display (LCD) panel, according to one embodiment of the present invention.

In the embodiment, the drive system includes two groups of drive circuits 11: first drive circuits (e.g., scan drive circuits) X0-Xm disposed on a first periphery along a first direction (e.g., X axis) of a substrate 10, and second drive circuits (e.g., data drive circuits) Y0-Yn disposed on a second periphery along a second direction (e.g., Y axis) of the substrate 10. Each drive circuit 11 is coupled to one or more column/row wires 12 of the matrix scanning device. In one exemplary embodiment, the substrate 10 is the glass substrate of a touch panel as the matrix scanning device.

The drive system also includes a master controller 13 configured to control the first drive circuits X0-Xm and the second drive circuits Y0-Yn. The master controller 13 is usually, but not necessarily, disposed externally to the substrate 10. An electrical bus 14 is electrically coupled, and configured for transferring signals, among the master controller 13, the first drive circuits X0-Xm and the second drive circuits Y0-Yn. One or more bus wires of the bus 14 may be configured as either analog channels (in an analog mode) or digital channels (in a digital mode). According to one embodiment, the bus 14 may be utilized to transfer signals, between the substrate 10 and the master controller 13, in a time-sharing and/or batch manner. Accordingly, the number of input/output pins of the master controller 13 can be substantially reduced, and the border spacer of the substrate 10 can also be reduced.

Figure 2:
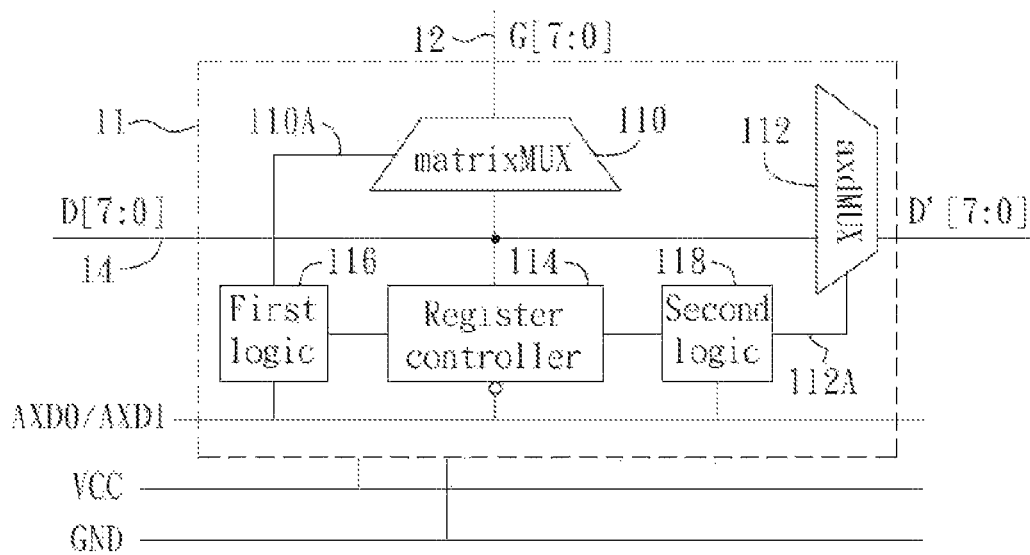
FIG. 2 shows a detailed block diagram of one drive circuit according to the embodiment of the present invention.
Figure 3:
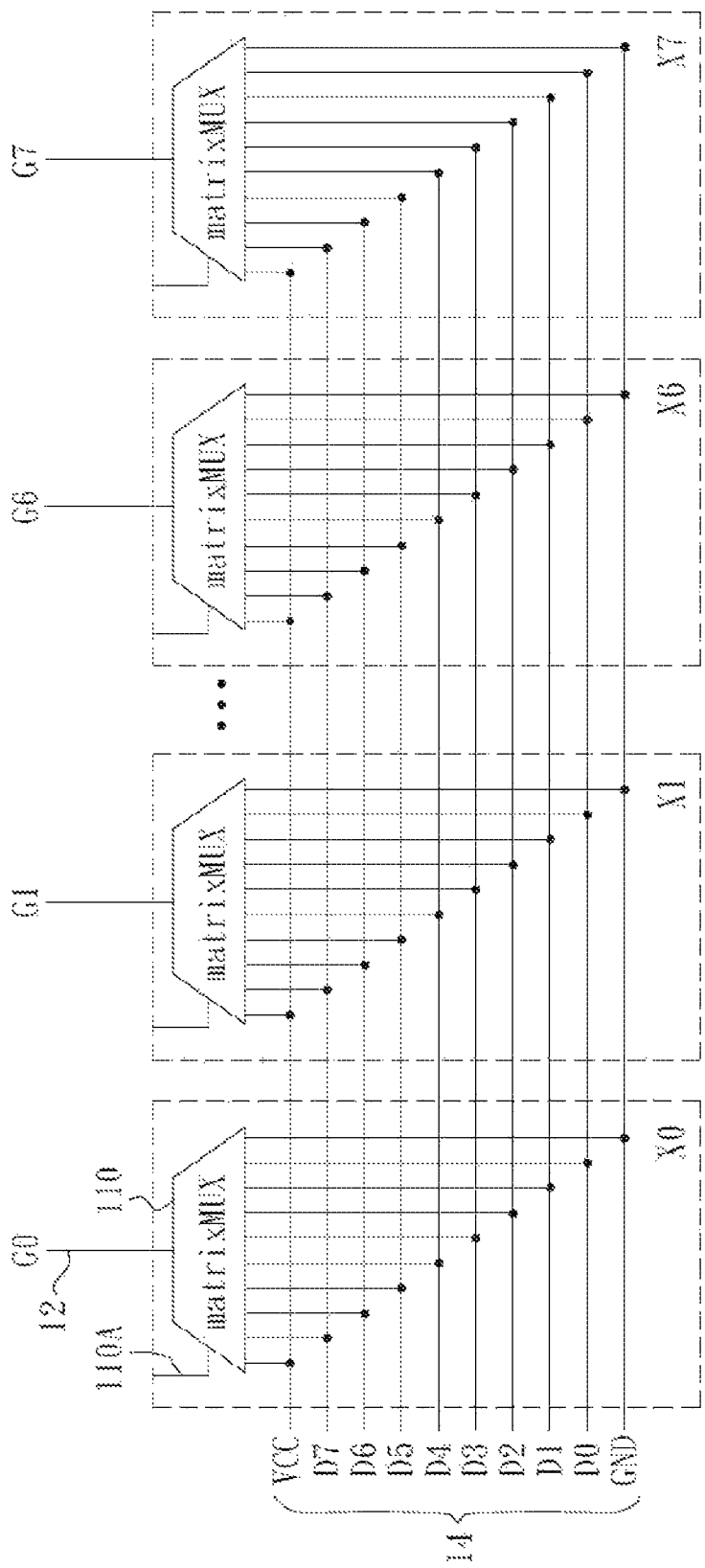
FIG. 3 shows exemplary connection of the matrix multiplexers of the drive circuits between the bus and the row/column wires.

FIG. 2 shows a detailed block diagram of one drive circuit 11 according to the embodiment of the present invention. In the embodiment, the drive circuit 11 primarily includes a matrix multiplexer (matrixMUX) 110, an analog/digital multiplexer (axdMUX) 112 and a register controller 114. The register controller 114 is electrically coupled to the bus 14. The matrix multiplexer 110 is electrically coupled to at least one row/column wire 12, which is controllably communicated to one bus wire of the bus 14 via the matrix multiplexer 110, under control of the register controller 114 and an analog/digital switching signal AXD0 or AXD1 originated from the master controller 13. The analog/digital switching signal AXD0 is used to control the first drive circuits X0-Xm, and the analog/digital switching signal AXD1 is used to control the second drive circuits Y0-Yn. For example, the matrix multiplexer 110 may be controlled by a first control signal 110A that is generated by a first logic circuit 116 under control of the register controller 114 and the analog/digital switching signal AXD0/AXD1. In the embodiment, when the analog/digital switching signal AXD0/AXD1 is "1", the bus 14 is switched to the analog mode; otherwise, when the analog/digital switching signal AXD0/AXD1 is "0", the bus 14 is switched to the digital mode. FIG. 3 shows exemplary connection of the matrix multiplexers 110 of the first drive circuits X0-Xm between the bus 14 and the column wires 12 of the matrix scanning device. The connection between the bus 14 and the column wire 12 is configured according to stored register content that is loaded by the master controller 13.

Referring back to FIG. 2, the analog/digital multiplexer 112 is used to regulate the analog/digital signal transferred on the bus 14 under control of the register controller 114 and the analog/digital switching signal AXD0/AXD1. For example, the analog/digital multiplexer 112 may be controlled by a second control signal 112A that is generated by a second logic circuit 118 under control of the register controller 114 and the analog/digital switching signal AXD0/AXD1.

Figure 4:
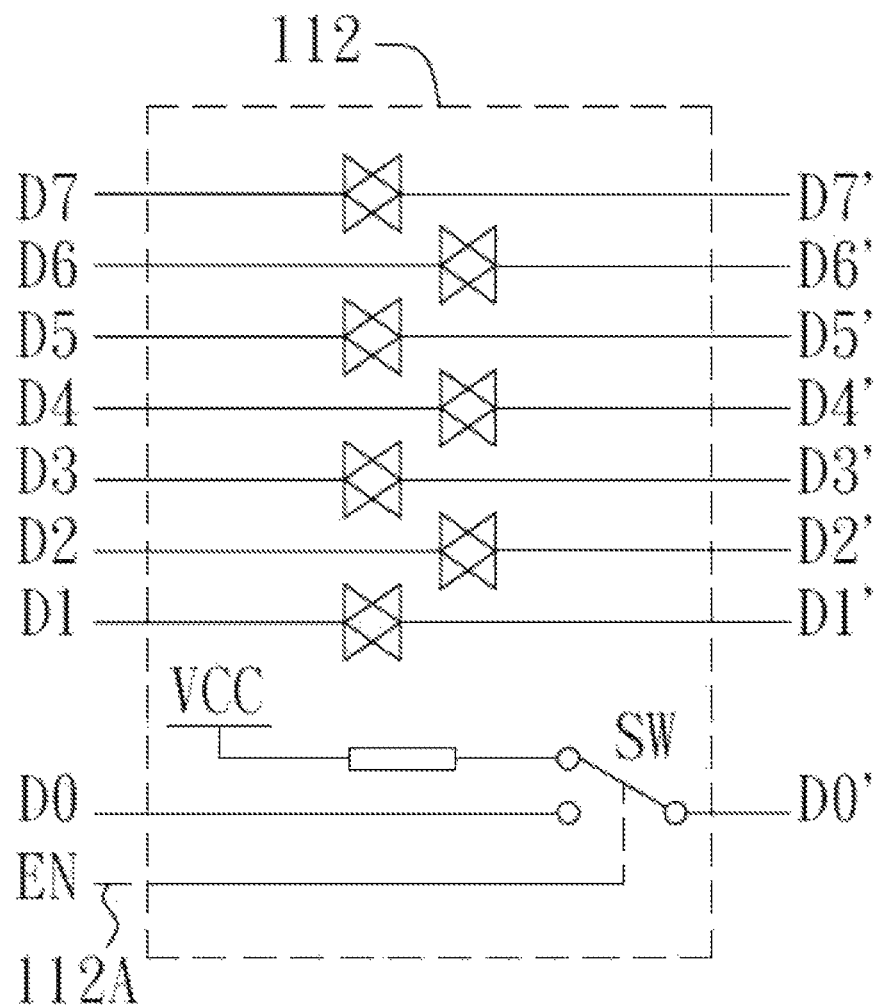
FIG. 4 shows a detailed block diagram of the analog/digital multiplexer according to the embodiment.

FIG. 4 shows a detailed block diagram of the analog/digital multiplexer 112 according to the embodiment. In the embodiment, a bus wire D0 is reserved to automatically figure out the total number of the configured drive circuits (e.g., X0-Xm in FIG. 1). For example, after the drive circuit 11 has been set, a switch SW of its analog/digital multiplexer 112 is closed by the second control signal 112A, and a predefined signal (e.g., "0") at the bus wire node D0 is thus transferred to the bus wire node D0'. The last drive circuit (e.g., Xm in FIG. 1) of the connected drive circuits finally feed the predefined signal at its bus wire node D0' as a feedback signal FBK0 or FBK1 back to the master controller 13. For example, the feedback signal FBK0 is fed back from the first drive circuit Xm, and the feedback signal FBK1 is fed back from the second drive circuit Yn. Upon detecting the feedback signal FBK0/FBK1, the master controller 13 therefore figures out the total number of the configured drive circuits.

Figure 5:
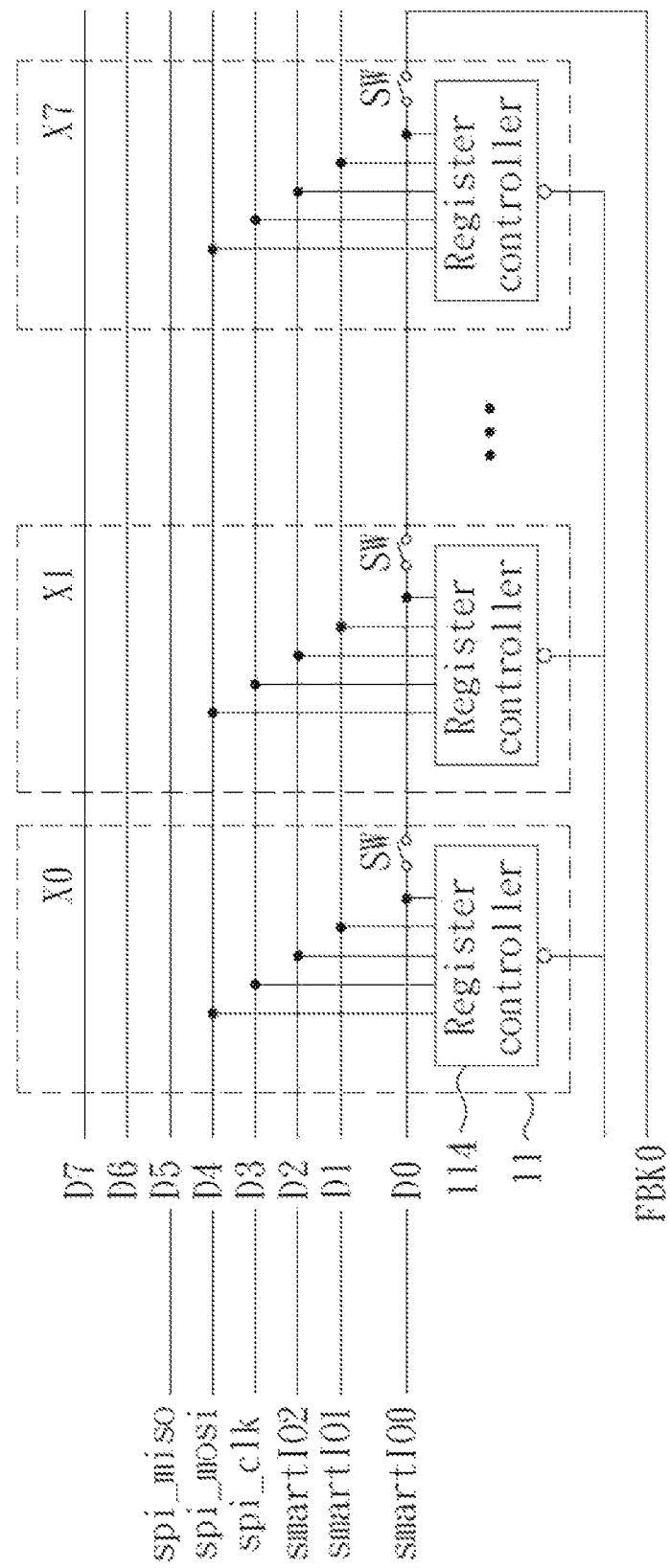
FIG. 5 shows exemplary connection among the bus and the drive circuits.

In the embodiment, some bus wires of the bus 14 may be adaptively utilized according to a specific operating mode. FIG. 5 shows exemplary connection among the bus 14 and the first drive circuits X0-Xm. For example, the bus wires denoted spi_miso, spi_mosi and spi-clk are used as bus signals specified by Serial Peripheral Interface (SPI) standard, and the bus wires denoted samrtIO0, smartIO1 and smartIO2 are used to configure various operating modes of the drive system.

Figure 6:
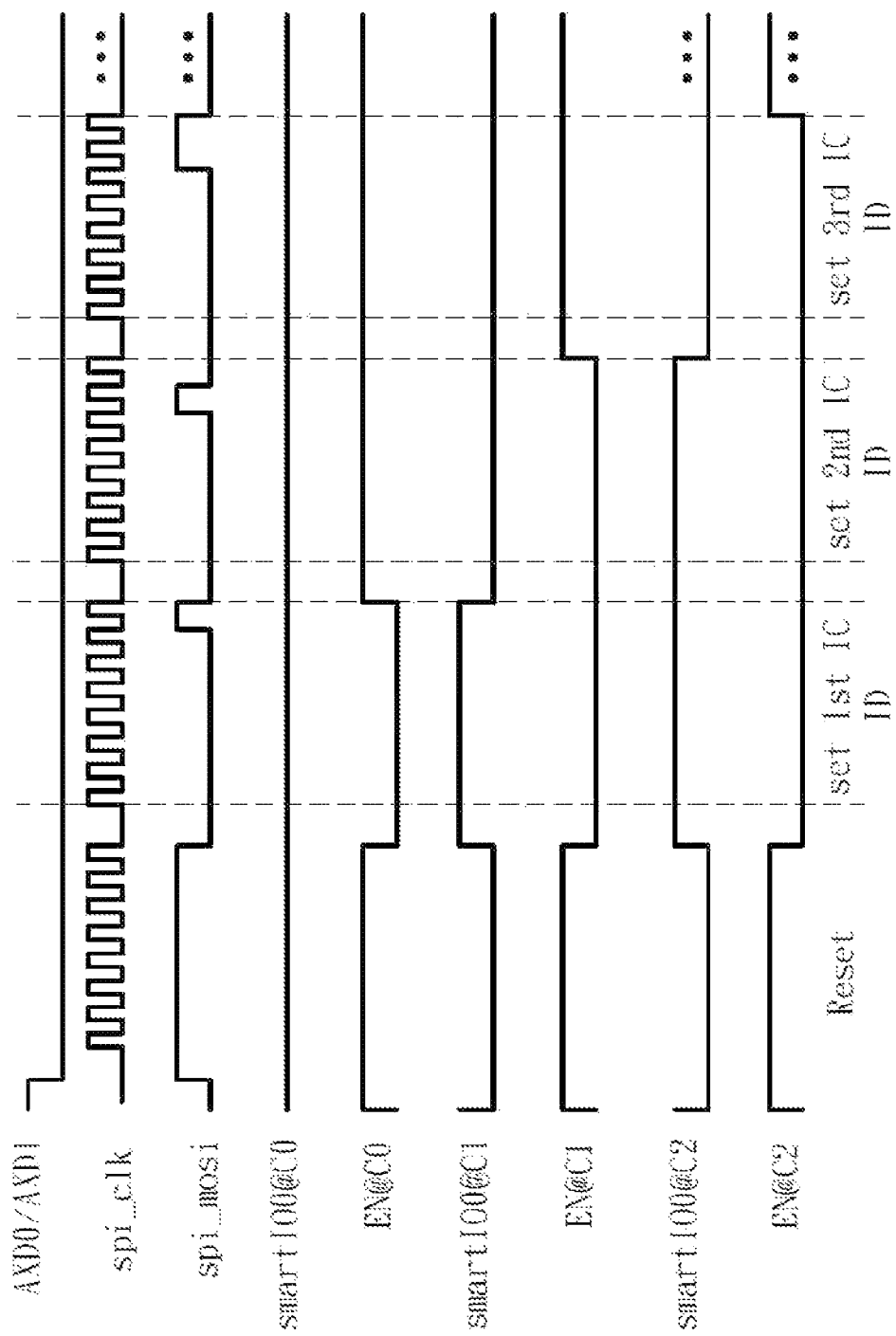
FIG. 6 shows a timing diagram illustrated of resetting and ID-setting the drive circuits.

Before the drive system can be operated with the matrix scanning device, the drive circuit 11 is to be reset and be set with respective identification (ID). FIG. 6 shows a timing diagram illustrated of resetting and ID-setting the drive circuits 11. Based on the ID stored in the respective register controller 114 of the drive circuit 11, each drive circuit 11 can then be addressed to perform data/signal reading or writing.

Although specific embodiments have been illustrated and described, it will be appreciated by those skilled in the art that various modifications may be made without departing from the scope of the present invention, which is intended to be limited solely by the appended claims.

What is claimed is:

1. A drive system adaptable to a matrix scanning device, comprising:
a plurality of first drive circuits disposed on a first periphery along a first direction of a substrate with each said first drive circuit being electrically coupled to at least one column wire of the matrix scanning device;
a plurality of second drive circuits disposed on a second periphery along a second direction of the substrate with each said second drive circuit being electrically coupled to at least one row wire of the matrix scanning device;
a master controller configured to control the first drive circuits and the second drive circuits; and
a bus electrically coupled to the master controller, the first drive circuits and the second drive circuits, wherein at least one bus wire of the bus is configured as either an analog channel in an analog mode or a digital channel in a digital mode and the master controller outputs an analog/digital switching signal used to switch between the analog mode and the digital mode;
wherein each of the plurality of first drive circuits comprises:
a register controller electrically coupled to the bus;
a matrix multiplexer electrically coupled to at least one said column wire and controllably communicated to one bus wire of the bus under control of the respective first drive circuits register controller and the analog/digital switching signal; and
an analog or digital multiplexer configured to regulate signal transferred on the bus under control of the respective first drive circuits register controller and the analog/digital switching signal;
and wherein each of the plurality of second drive circuits comprises:
a register controller electrically coupled to the bus;
a matrix multiplexer electrically coupled to at least one said row wire and controllably communicated to one bus wire of the bus under control of the respective second drive circuits register controller and the analog/digital switching signal; and
an analog or digital multiplexer configured to regulate signal transferred on the bus under control of the respective second drive circuits register controller and the analog/digital switching signal,
wherein the plurality of first drive circuits and the plurality of second drive circuits each comprises a logic circuit configured to generate a control signal under control of the respective first drive circuits register controller and the analog/digital switching signal, and respective second drive circuits register controller and the analog/digital switching signal, correspondingly,
wherein each analog or digital multiplexer comprises a switch which is closed by the control signal after the associated first or second drive circuit has been set, such that a predefined signal passes through the analog or digital multiplexer, and
wherein the master controller comprises a feedback signal node configured to receive the predefined signal from a first drive circuit through which the predefined signal passes last in the plurality of first drive circuits or a second drive circuit through which the predefined signal passes last in the plurality of second drive circuits.

2. The drive system of claim 1, wherein the matrix scanning device is a touch panel.

3. The drive system of claim 1, wherein the master controller is disposed externally to the substrate.

4. The drive system of claim 1, wherein a connection between the row or the column wire and the bus is configured according to stored register content in the respective first drive circuits register controller or the respective second drive circuits register controller.

5. The drive system of claim 4, wherein the register content is loaded by the master controller.

6. The drive system of claim 1, wherein the master controller outputs a respective identification (ID) to each register controller of the first or second drive circuits respectively.

7. A drive system adaptable to a matrix scanning device, comprising:
a plurality of first drive circuits disposed on a first periphery along a first direction of a substrate with each said first drive circuit being electrically coupled to at least one column wire of the matrix scanning device;
a plurality of second drive circuits disposed on a second periphery along a second direction of the substrate with each said second drive circuit being electrically coupled to at least one row wire of the matrix scanning device;

a master controller configured to control the first drive circuits and the second drive circuits; and a bus electrically coupled to the master controller, the first drive circuits and the second drive circuits, wherein each of the first and second drive circuits is set with an identification and addressed according to the corresponding identification;

wherein each of the plurality of first drive circuits comprises:

a register controller electrically coupled to the bus;

a matrix multiplexer electrically coupled to at least one said column wire and controllably communicated to one bus wire of the bus under control of the respective first drive circuits register controller and the analog/digital switching signal; and an analog or digital multiplexer configured to regulate signal transferred on the bus under control of the respective first drive circuits register controller and the analog/digital switching signal;

and wherein each of the plurality of second drive circuits comprises:

a register controller electrically coupled to the bus;

a matrix multiplexer electrically coupled to at least one said row wire and controllably communicated to one bus wire of the bus under control of the respective second drive circuit registers controller and the analog/digital switching signal; and an analog or digital multiplexer configured to regulate signal transferred on the bus under control of the respective second drive circuits register controller and the analog/digital switching signal, wherein the plurality of first drive circuits and the plurality of second drive circuits each comprises a logic circuit configured to generate a control signal under control of the respective first drive circuits register controller and the analog/digital switching signal, and respective second drive circuits register controller and the analog/digital switching signal, correspondingly, wherein each analog or digital multiplexer comprises a switch which is closed by the control signal after the associated first or second drive circuit has been set, such that a predefined signal passes through the analog or digital multiplexer, and wherein the master controller comprises a feedback signal node configured to receive the predefined signal from a first drive circuit through which the predefined signal passes last in the plurality of first drive circuits or a second drive circuit through which the predefined signal passes last in the plurality of second drive circuits.

* * * * *